United States Patent
Shin

(10) Patent No.: US 9,823,853 B2
(45) Date of Patent: Nov. 21, 2017

(54) DATA STORAGE DEVICE INCLUDING CONTROLLER FOR CONTROLLING NONVOLATILE MEMORY DEVICES

(71) Applicant: SK hynix Inc., Gyeonggi-do (KR)

(72) Inventor: Beom Ju Shin, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 0 days.

(21) Appl. No.: 15/217,123

(22) Filed: Jul. 22, 2016

(65) Prior Publication Data
US 2017/0269833 A1    Sep. 21, 2017

(30) Foreign Application Priority Data
Mar. 21, 2016   (KR) .......................... 10-2016-0033364

(51) Int. Cl.
*G11C 7/00*     (2006.01)
*G06F 3/06*     (2006.01)
(52) U.S. Cl.
CPC ............ *G06F 3/061* (2013.01); *G06F 3/0655* (2013.01); *G06F 3/0688* (2013.01)

(58) Field of Classification Search
CPC ...... G11C 5/02; G11C 16/3427; G11C 7/1087; G11C 7/1096; G11C 8/10; G11C 13/0033
USPC ...................................... 365/230.03
See application file for complete search history.

(56) References Cited

U.S. PATENT DOCUMENTS

2011/0141831 A1*  6/2011  Norman .................. G11C 5/02
                                                              365/189.15
2015/0019766 A1   1/2015  Lin et al.

FOREIGN PATENT DOCUMENTS

KR        1020130060795        6/2013

* cited by examiner

*Primary Examiner* — Pho M Luu
*Assistant Examiner* — Xiaochun L Chen
(74) *Attorney, Agent, or Firm* — IP & T Group LLP

(57) ABSTRACT

A data storage device includes a first nonvolatile memory device including a target memory region, and a controller suitable for performing a first data input operation to transmit first data, which is to be stored in the target memory region, to the first nonvolatile memory device, regardless of whether a size of the first data corresponds to the target memory region.

17 Claims, 9 Drawing Sheets

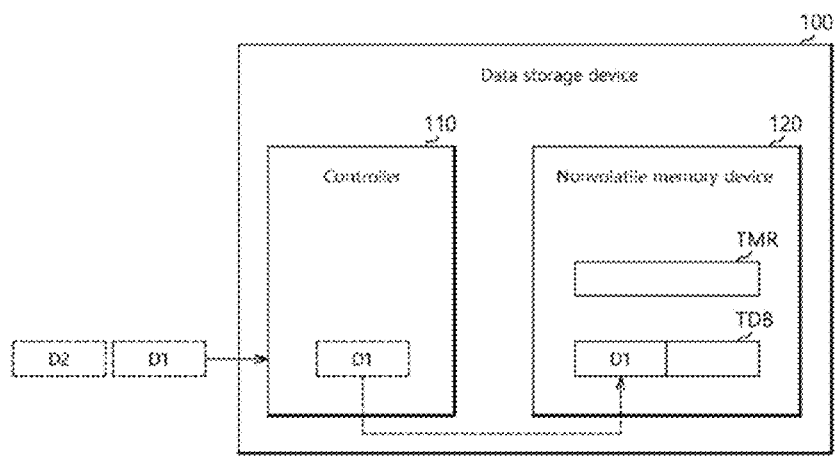
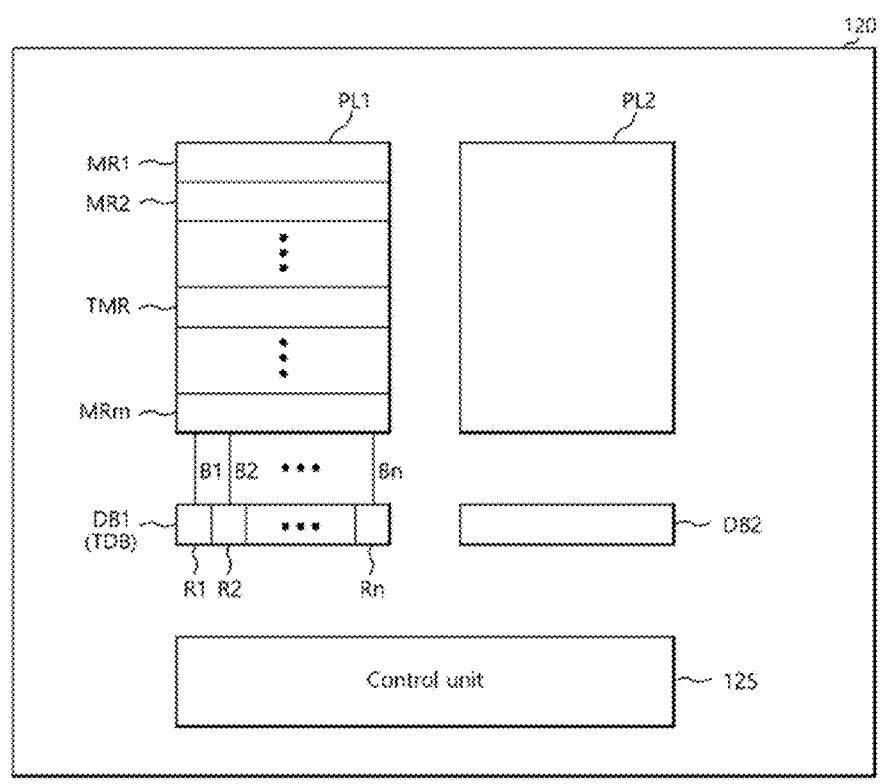

DATA STORAGE DEVICE INCLUDING CONTROLLER FOR CONTROLLING NONVOLATILE MEMORY DEVICES

CROSS-REFERENCES TO RELATED APPLICATION

The present application claims priority under 35 U.S.C. §119(a) to Korean application number 10-2016-0033364, filed on Mar. 21, 2016, in the Korean Intellectual Property Office, which is Incorporated herein by reference in its entirety.

BACKGROUND

1. Technical Field

Various embodiments generally relate to a data storage device and, more particularly, to a data storage device including a nonvolatile memory device.

2. Related Art

Data storage devices store data provided by an external device in response to a write request. Data storage devices may also provide stored data to an external device in response to a read request. Examples of external devices that use data storage devices include computers, digital cameras, cellular phones and the like. Data storage devices can be embedded in external devices or fabricated separately and then connected afterwards.

SUMMARY

In an embodiment, a data storage device may include: a first nonvolatile memory device including a target memory region; and a controller suitable for performing a first data input operation to transmit first data, which is to be stored in the target memory region, to the first nonvolatile memory device, regardless of whether a size of the first data corresponds to the target memory region.

In an embodiment, a data storage device may include: a first nonvolatile memory device including a target memory region; and a controller suitable for performing a first data input operation to transmit first data to the first nonvolatile memory device regardless of whether second data to be stored in the target memory region collectively with the first data has been acquired, performing a second data input operation to transmit the second data to the first nonvolatile memory device, and controlling the first nonvolatile memory device such that data transmitted to the first nonvolatile memory device is collectively stored in the target memory region.

In an embodiment, a data storage device may include: first and second nonvolatile memory devices; and a controller suitable for performing a first data input operation to transmit first data to the first nonvolatile memory device, performing a second data input operation to transmit second data to the first nonvolatile memory device, performing the first data input operation to transmit third data to the second nonvolatile memory device between the first and second data input operations for the first nonvolatile memory device, and controlling the first nonvolatile memory device such that the first and second data transmitted to the first nonvolatile memory device are collectively stored in a target memory region of the first nonvolatile memory device.

In an embodiment, a data storage device may include: a nonvolatile memory device including a target memory region and a target data buffer; and a controller suitable for controlling the nonvolatile memory device to collect externally provided data in the target data buffer without performing a write operation to the target memory region with the data collected in the target data buffer until total size of data collected in the target data buffer becomes equal to storage capacity of the target memory region.

BRIEF DESCRIPTION OF THE DRAWINGS

FIG. 1 is a block diagram Illustrating a data storage device, including a controller and a nonvolatile memory device, according to an embodiment of the present invention.

FIG. 2 is a block diagram Illustrating an example of a more detailed configuration for the nonvolatile memory device of FIG. 1.

DETAILED DESCRIPTION

Figure 3:
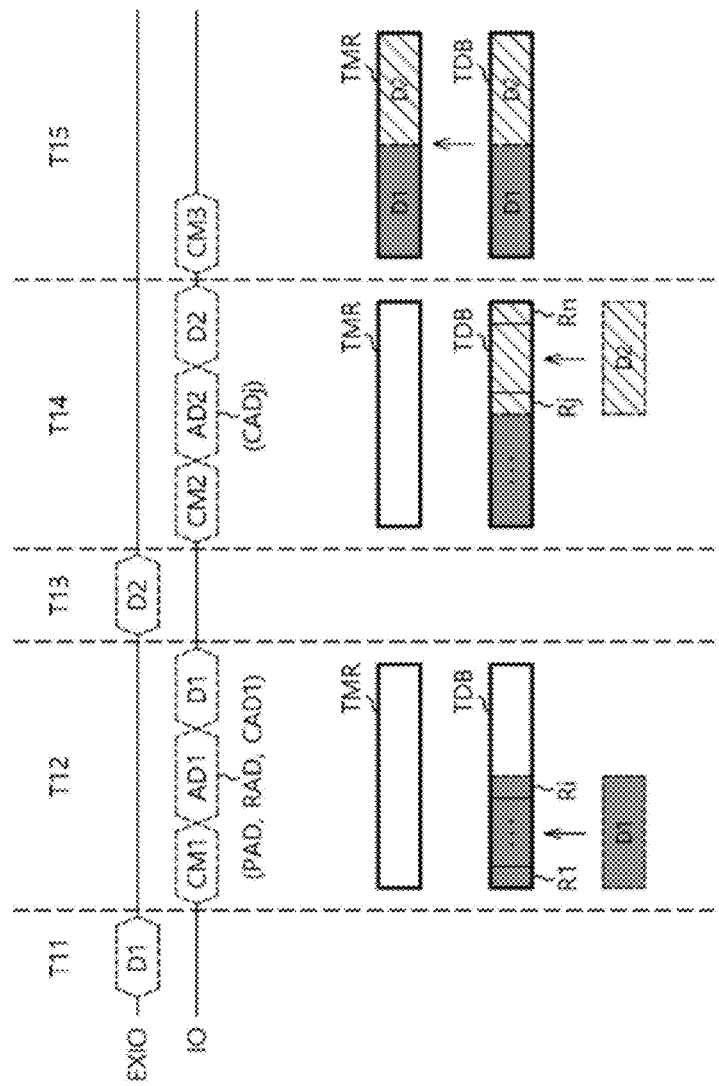
FIG. 3 is a simplified schematic diagram illustrating an operating method of the data storage device of FIG. 1, according to an embodiment of the present invention.

Hereinafter, a data storage device and an operating method thereof according to the present invention will be described with reference to the accompanying drawings through various embodiments of the present invention. The present invention may, however, be embodied in other different forms and should not be construed as being limited to the embodiments set forth herein. Rather, these embodiments are provided for describing the present invention in sufficient detail to enable a person skilled in the art to which the invention pertains to make and use the present invention.

It is to be understood that embodiments of the present invention are not limited to the particulars shown in the drawings, that the drawings are not necessarily to scale and, in some instances, proportions may have been exaggerated in order to more clearly depict certain features of the invention.

While particular terminology is used, it is to be appreciated that the terminology used is for describing particular embodiments only and is not intended to limit the scope of the present invention.

It will be understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the present invention.

It will be further understood that when an element is referred to as being "connected to", or "coupled to" another element, it may be directly on, connected to, or coupled to the other element, or one or more Intervening elements may be present. In addition, it will also be understood that when an element is referred to as being "between" two elements, it may be the only element between the two elements, or one or more intervening elements may also be present.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, a feature or element described in connection with one embodiment may be used singly or in combination with other features or elements of another embodiment, unless otherwise specifically indicated.

Hereinafter, the various embodiments of the present invention will be described in detail with reference to the attached drawings.

Referring now to FIG. 1 a data storage device 100 is provided, according to an embodiment of the present invention. The data storage device may be coupled to one or more external devices (not shown). For example, in response to a write request from an external device (not shown), the data storage device 100 may be configured to store data provided from the external device. Also, in response to a read request from the external device the data storage device 100 may be configured to provide stored data to the external device. The external device may be a host device such as desktop or portable electronic device.

The data storage device 100 may be configured as a Personal Computer Memory Card International Association (PCMCIA) card, a Compact Flash (CF) card, a smart media card, a memory stick, various multimedia cards (MMC, eMMC, RS-MMC, and MMC-Micro), various secure digital cards (SD, Mini-SD, and Micro-SD), a Universal Flash Storage (UFS), a Solid State Drive (SSD) and the like.

The data storage device 100 may include a controller 110 and a nonvolatile memory device 120.

The controller 110 may control the operations of the data storage device 100. For example, the controller 110 may store data in the nonvolatile memory device 120 in response to a write request transmitted from the external device, may read in response to a read request transmitted from the external device data stored in the nonvolatile memory device 120, and may transmit the read data to the external device. Transmission of the read data may be made via a communication channel. The communication channel may be any suitable physical communication channel. The communication channel may be a wireless communication channel.

The external device may transmit data D1 and D2 to be stored in the data storage device 100 by a predetermined unit of transmission data. For example, the unit of transmission data may correspond to a memory unit of the nonvolatile memory device 120.

The nonvolatile memory device 120 may store data by a unit of write data corresponding to a memory unit. The memory unit may correspond to the size of a target memory region TMR, to which the nonvolatile memory device 120 performs a write operation. The unit of write data may correspond to the size of data to be stored in the target memory region TMR. Hence, the nonvolatile memory device 120 may perform a write operation to the target memory region TMR by the unit of write data.

The unit of write data may differ from the unit of transmission data of the external device. In an embodiment of the present invention, when the external device transmits data having a size which is less than the unit of write data to the controller 110, the transmitted data are not stored instantly in the target memory region TMR of the nonvolatile memory device 120, but instead the nonvolatile memory device 120 collects the transmitted data until the size of the collected data becomes equal to the unit of write data of the target memory region. When the size of the collected data becomes equal to the unit of write data of the target memory region, the nonvolatile memory device 120 may then store the collected data (having the size of the write data unit) in the target memory region TMR.

According to an embodiment, when a first data D1 is provided from the external device, the controller 110 may perform a first data input operation by transmitting the first data D1 to the nonvolatile memory device 120 regardless of whether or not the size of the first data D1 is equal to the unit of write data. The first data input operation may be performed to firstly input the first data D1 to a target data buffer TDB corresponding to the target memory region TMR.

The controller 110 then determines whether the size of data collected in the target data buffer TDB is equal to the unit of write data of the target memory region TMR. When it is determined that the size of the data collected in the target data buffer TDB is or becomes equal to the unit of write data of the target memory region through one or more of the first data input operations, the controller 110 may then control the nonvolatile memory device 120 to store the collected data of the target data buffer TDB into the target memory region TMR. However, when it is determined that the size of the data collected in the target data buffer TDB is less than the unit of write data, the controller 110 continues collecting data, which is provided from the external device, in the target data buffer TDB until the size of data collected in the target data buffer TDB becomes equal to the unit of write data of the target memory region TMR.

Hence, when a second data D2 subsequent to the first data D1 (which is stored in the target data buffer TDB) is provided from the external device, the controller 110 may perform a second data input operation by transmitting the second data D2 to the target data buffer TDB. The second data input operation may be performed to successively input the second data D2 to the target data buffer TDB.

The controller 110 iterates the second data input operation for subsequent data until the size of data collected in the target data buffer TDB becomes equal to the unit of write data of the target memory region through the first and second data input operations. When it is determined that the size of data collected in the target data buffer TDB becomes equal to the unit of write data through the first and second data input operations, the controller 110 may control the nonvolatile memory device 120 to store the collected data of the target data buffer TDB into the target memory region TMR. For example, when it is determined that the size of data collected in the target data buffer TDB becomes equal to the unit of write data upon collection of the second data D2 in the target memory region TMR (i.e., the size of the collected first and second data D1 and D2 in the target data buffer TDB becomes equal to the unit of write data), the controller 110 may control the nonvolatile memory device 120 to store the collected first and second data D1 and D2 of the target data buffer TDB into the target memory region TMR.

When the size of data collected in the target data buffer TDB has not yet become equal to the unit of write data, the controller 110 may perform the first and second data input operations by continuously collecting the first and second data D1 and D2 and the subsequent data in the target data buffer TDB of the nonvolatile memory device 120 other than an internal memory (not shown) of the controller 110. Consequentially, even if the controller 110 has an internal memory of a small capacity, there is no need to use the internal memory of the controller to buffer for a long time data to be stored in the nonvolatile memory device 120 and thus the controller 110 can have enhanced operation performance as the Internal memory of the controller can be more efficiently managed.

As described above, when the sizes of the first data D1 and second data D2 correspond to the unit of write data, the second data input operation may be performed only one time. According to an embodiment, the second data input operation may be performed several times depending on the total size of the buffered data of the target data buffer TDB (e.g., the size of the first data D1 and the size of the subsequent data). That is, after the first data input operation, the controller 110 may iterate the second data input operation each time the subsequent data is provided from the external device, until the size of data collected in the target data buffer TDB becomes equal to the unit of write data.

According to an embodiment, the controller 110 may perform the first and second data input operations not only for data transmitted from the external device but also for internally generated data.

The nonvolatile memory device 120 may include the target memory region TMR and the target data buffer TDB.

The nonvolatile memory device 120 may collect, according to control of the controller 110, data transmitted from the controller 110, in the target data buffer TDB until the size of data collected in the target data buffer TDB becomes equal to the unit of write data. When the size of data collected in the target data buffer TDB becomes equal to the unit of write data, the nonvolatile memory device 120 may store the collected data into the target memory region TMR through a write operation with the collected data.

The nonvolatile memory device 120 may be or include a flash memory, such as a NAND flash or a NOR flash, a Ferroelectrics Random Access Memory (FeRAM), a Phase-Change Random Access Memory (PCRAM), a Magnetoresistive Random Access Memory (MRAM), a Resistive Random Access Memory (ReRAM), and the like.

FIG. 2 illustrates an example of a more detailed configuration of the nonvolatile memory device 120 of FIG. 1.

Referring to FIG. 2, the nonvolatile memory device 120 may include a control unit 125, planes PL1 and PL2, and data buffers DB1 and DB2.

The control unit 125 may control the operations of the nonvolatile memory device 120 according to control of the controller 110 of FIG. 1. The control unit 125 may control internal units of the nonvolatile memory device 120 in response to a command transmitted from the controller 110. The control unit 125 may select the target memory region TMR in response to an address transmitted from the controller 110, and select one or more of registers R1 to Rn as the target data buffer TDB for collecting data provided from the controller until the size of data collected in the target data buffer TDB becomes equal to the unit of write data of the target memory region.

The planes PL1 and PL2 may each include a plurality of nonvolatile memory cells. The planes PL1 and PL2 may each include a plurality of memory regions. For example, the plane PL1 may include a plurality of memory regions MR1 to MRm. Each of the memory regions MR1 to MRm may be selected as the target memory region TMR. The memory regions MR1 to MRm may correspond to row addresses. The memory regions MR1 to MRm may each be, for example, a page. The plane PL2 may have substantially the same configuration as that of the plane PL1.

The nonvolatile memory device 120 may perform a write operation to each of the planes PL1 and PL2 by the unit of write memory. The unit of write memory may be the unit of memory by which the write operation is performed. The unit of write memory may correspond to, for example, to a single one of the memory regions MR1 to MRm (i.e., the target memory region TMR). The unit of write data may be the size of data to be stored in the target memory region TMR (i.e., the unit of write memory).

The data buffers DB1 and DB2 may respectively correspond to the planes PL1 and PL2. For example, data transmitted from the controller 110 may be collected in the data buffer DB1 before being stored in the plane PL1, and data read from the plane PL1 may be buffered to the data buffer DB1 before being transmitted to the controller 110.

The data buffer DB1 may include a plurality of registers R1 to Rn, the total size of which corresponds to the unit of write data. Data collected in one or more of the registers R1 to Rn as the target data buffer TDB may be stored in the target memory region TMR through bit lines B1 to Bn. The bit lines B1 to Bn or the registers R1 to Rn may correspond to column addresses. That is, one of the registers R1 to Rn selected by a column address may collect data provided from the external device. The data buffer DB2 may have substantially the same configuration as that of the data buffer DB1.

Although the nonvolatile memory device 120 has been illustrated in FIG. 2 as including the two planes PL1 and PL2, the present invention is not limited to such configuration. For example, in an embodiment the nonvolatile memory device may include a single plane. In another embodiment, the nonvolatile memory device may include three or more planes.

FIG. 3 is a diagram illustrating an example of an operating method of the data storage device 100 of FIG. 1. In FIG. 3, it is assumed that the size of the first data D1 is less than the unit of write data of the nonvolatile memory device 120 while the total size of the first and second data D1 and D2 correspond to the unit of write data.

Referring to FIG. 3, in time segment T11, the controller 110 may receive the first data D1 from the external device through a transmission line EXIO.

In time segment T12, the controller 110 may perform the first data input operation. In detail, the controller 110 may perform the first data input operation by transmitting a first command CM1, a first address AD1 and the first data D1 to the nonvolatile memory device 120.

The first address AD1 may include a plane address PAD which may specify the target memory region TMR, a row address RAD, and a start column address CAD1, that is, a column address corresponding to the register R1.

Based on the first command CM1 and the first address AD1, the nonvolatile memory device 120 may select the register R1, which is a first one to collect the first data D1 as the target data buffer TDB, and may collect the first data D1 in the registers R1 to R1 as the target data buffer TDB.

Upon collection of the first data D1, the controller 110 may determine whether the size of the collected first data D1 corresponds to the unit of write data. Since the size of the first data D1 does not correspond to the unit of write data as assumed, the controller 110 does not transmit the data D1 from the temporary data buffer TDB to the target memory region TMR, but proceeds to receive the second data D2 from the external device.

Hence, in time segment T13, the controller 110 may receive the second data D2 from the external device.

In time segment T14, the controller 110 may then perform the second data input operation. In detail, the controller 110 may perform the second data input operation by transmitting a second command CM2, a second address AD2 and the second data D1 to the nonvolatile memory device 120.

The second address AD2 may include a column address CADj corresponding to a register RJ. The register Rj may be a register which follows the registers R1 to Ri occupied by the first data D1. The controller 110 may determine the column address CADj based on the size of the first data D1 and the size of the respective registers R1 to Rn. Because the target data buffer TDB has been already specified based on the address AD1 during the first data input operation, the address AD2 need not include the plane address PAD or the row address RAD. Therefore, the controller 110 may perform one of the first and second data input operations according to the provided first and second addresses AD1 and AD2.

Based on the second command CM2 and the address AD2, the nonvolatile memory device 120 may select the register Rj, which is a first one to collect the second data D2 as the target data buffer TDB, and store the second data D2 to the registers Rj to Rn as the target data buffer TDB.

In time segment T15, the controller 110 may determine whether the size of the collected first and second data D1 and D2 in the target data buffer TDB becomes equal to the unit of write data, and control the nonvolatile memory device 120 to perform the write operation to the target memory region TMR with the collected first and second data D1 and D2.

In detail, when controller 110 determines that the size of the collected first and second data D1 and D2 in the target data buffer TDB becomes equal to the unit of write data, the controller 110 may control the nonvolatile memory device 120 by transmitting a third command CM3. The nonvolatile memory device 120 may perform the write operation by collectively storing the collected first and second data D1 and D2 of the target data buffer TDB into the target memory region TMR based on the third command CM3.

When the first data input operation is performed with data having the size of the unit of write data then there is no need to collect subsequent data in the target data buffer TDB and thus the second data input operation may not be performed. In this case, the controller 110 will transmit the data of the unit of write data to the nonvolatile memory device 120 based on the first command CM1, and the nonvolatile memory device 120 may collect the transmitted data in the target data buffer TDB. Thereafter, the controller 110 may instantly transmit the third command CM3 to the nonvolatile memory device 120, and the nonvolatile memory device 120 may store the collected data of the unit of write data into the target memory region TMR.

Although the unit of write memory has been illustrated in the above description as being a single memory region, the unit of write memory may be a plurality of memory regions in some embodiments. That is, the nonvolatile memory device 120 may simultaneously store data in a plurality of target memory regions. In this case, the unit of write data may be the size of data to be stored in the plurality of target memory regions. In a manner substantially similar to the above-mentioned operating method, the controller 110 may simultaneously store, in the plurality of target memory regions, data having the unit of write data collected in the target data buffer TDB.

According to an embodiment, the unit of write memory may include two or more memory regions which are respectively included in the planes PL1 and PL2. That is, the nonvolatile memory device 120 may simultaneously store data in the target memory region of the plane PL1 and the target memory region of the plane PL2. In a manner substantially similar to the above-mentioned operating method, the controller 110 may collect data corresponding to the unit of write data in the data buffers DB1 and DB2, and simultaneously store, in the target memory regions of the planes PL1 and PL2, the data having the unit of write data collected in the data buffers DB1 and DB2.

According to an embodiment, the data storage device 100 may include a plurality of nonvolatile memory devices. In this regard, if the respective nonvolatile memory devices may receive commands, addresses and data from the controller 110 through distinct transmission lines, the controller 110 may individually control the plurality of nonvolatile memory devices 120 in the substantially same manner as the method of controlling the nonvolatile memory device 120 of FIG. 1.

Figure 4:
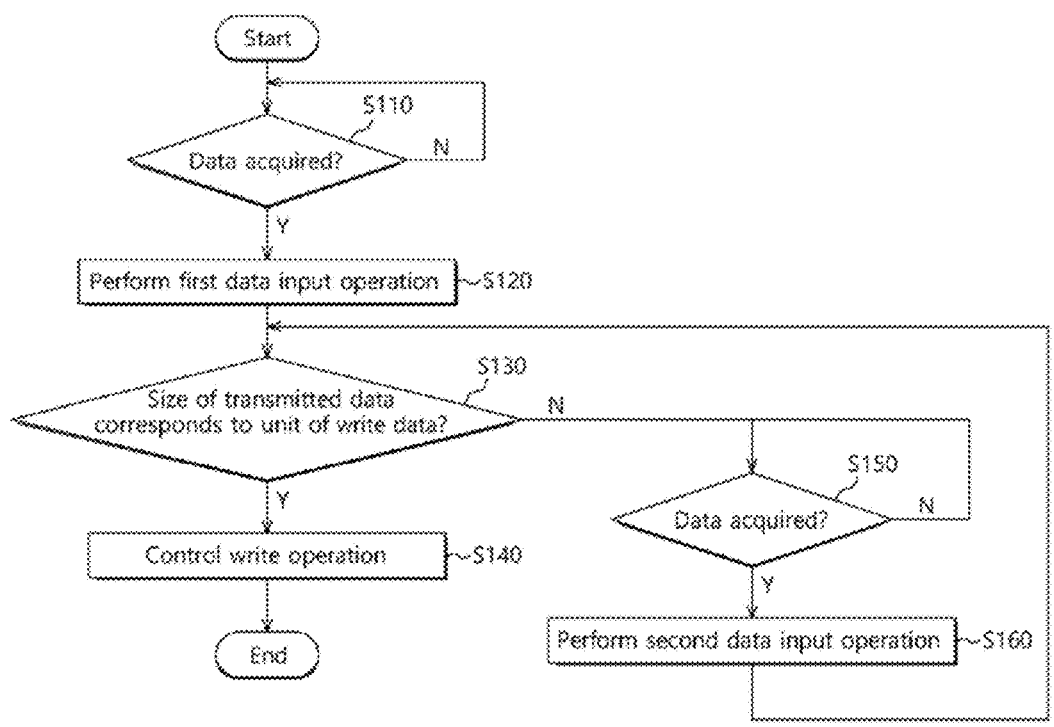
FIG. 4 is a flowchart of an operating method of the data storage device of FIG. 1, according to an embodiment of the present invention.

Referring now to FIG. 4 an operating method of the data storage device 100 of FIG. 1 will be described, according to an embodiment of the present invention.

At step S110, the controller 110 determines whether data, e.g., the first data D1, to be stored in the nonvolatile memory device 120 has been acquired. The controller may be prompted to check whether data has been received upon receipt of a signal from an external device for example. If data has been acquired, the process then proceeds to step S120. If data has not been acquired, the controller may iterate step S110, for example, upon receipt of a signal form an external device or after a certain time interval.

At step S120, the controller 110 may perform a first data input operation to the nonvolatile memory device 120 with the acquired first data D1. The controller 110 may perform the first data input operation by transmitting the acquired data to the nonvolatile memory device 120. The nonvolatile memory device 120 may collect, according to control of the controller 110, the provided first data D1 In a target data buffer TDB corresponding to the target memory region TMR, which is defined by the first command CM1 and the first address AD1 provided along with the first data D1, as described with reference to FIG. 3.

At step S130, the controller 110 determines whether the size of the collected first data D1 In the target data buffer TDB corresponds to the size of the unit of write data. In the case where the size of the collected first data D1 corresponds to the unit of write data, the process proceeds to step S140. In the case where the size of the collected first data D1 does not correspond to the unit of write data, the process proceeds to step S150.

At step S140, the controller 110 controls the nonvolatile memory device 120 to perform the write operation to the target memory region TMR with the collected first data D1. The nonvolatile memory device 120 stores the collected first data D1 of the target data buffer TDB into the target memory region TMR.

At step S150, the controller 110 determines whether subsequent data (e.g., the second data D2) to be stored the nonvolatile memory device 120 has been acquired. If the subsequent data has been acquired, the process proceeds to step S160. If the subsequent data has not been acquired, the process iterates step S150.

At step S160, the controller 110 may perform the second data input operation to the nonvolatile memory device 120 with the acquired second data D2. The controller 110 may perform the second data input operation by transmitting the acquired second data D2 to the nonvolatile memory device 120. The nonvolatile memory device 120 may additionally collect, according to control of the controller 110, the provided second data D2 in the target data buffer TDB successively to the previously collected first data D1.

Upon collection of the second data D2 in the target data buffer TDB at step S160, the process proceeds back to step S130. That is, at step S130, the controller 110 determines whether the total size of collected first and second data D1 and D2 corresponds to the unit of write data. In the case where the total size of collected first and second data D1 and D2 does not correspond to the unit of write data, the controller 110 may iterate steps S130 to S160 for the subsequently acquired data (e.g., third data D3 subsequent to the collected first and second data D1 and D2).

Figure 5:
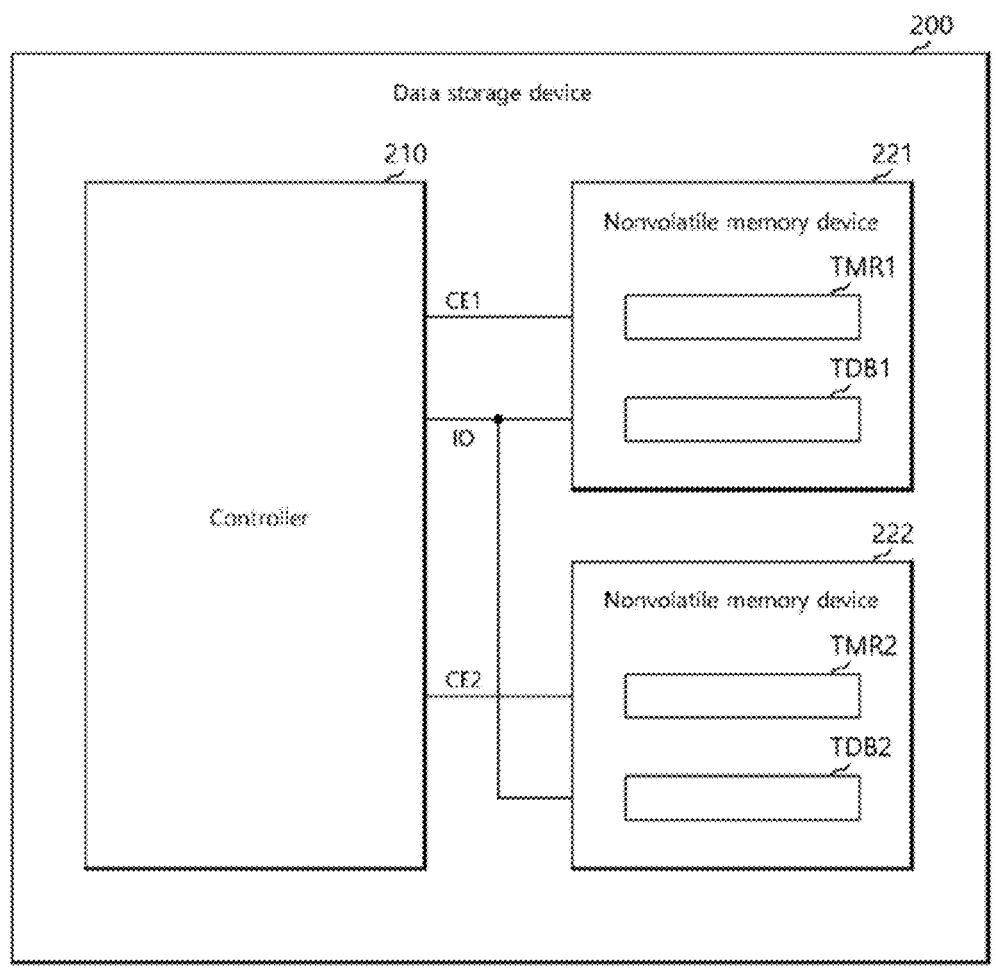
FIG. 5 is a block diagram illustrating a data storage device according to another embodiment of the present invention.

FIG. 5 is a block diagram illustrating a data storage device 200 according to another embodiment of the present invention.

Referring to FIG. 5, the data storage device 200 may include a controller 210 and nonvolatile memory devices 221 and 222.

The controller 210 may select any one of the nonvolatile memory devices 221 and 222 by selectively enabling enable signals CE1 and CE2 that respectively correspond to the nonvolatile memory devices 221 and 222. Therefore, the controller 210 may transmit a command, an address and data to a selected one of the nonvolatile memory devices 221 and 222 through a transmission line 10.

Each of the nonvolatile memory devices 221 and 222 may include target memory regions TMR1 and TMR2, and target data buffers TDB1 and TDB2.

The nonvolatile memory devices 221 and 222 may share the transmission line 10. Each of the nonvolatile memory devices 221 and 222 may receive, when a corresponding enable signal is enabled, a command, an address and data transmitted through the transmission line IO. For example, when the enable signal CE1 is enabled, the nonvolatile memory device 221 may receive a command, an address and data transmitted through the transmission line IO. When the enable signal CE1 is disabled the nonvolatile memory device 221 cannot receive a command, an address and data transmitted through the transmission line IO.

In the illustrated embodiment of FIG. 5, the controller 210 selectively enables the enable signals CE1 and CE2 to control any one of the nonvolatile memory devices 221 and 222. Also, in all other respects, the controller 210 may control each of the nonvolatile memory devices 221 and 222 in a substantially similar manner to that of the method in which the controller 110 of FIG. 1 controls the nonvolatile memory device 120.

Although the data storage device 200 has been Illustrated in FIG. 5 as including the two nonvolatile memory devices 221 and 222, the invention is not limited in this way. For example, according to another embodiment a storage device may include three or more nonvolatile memory devices.

Figure 6:
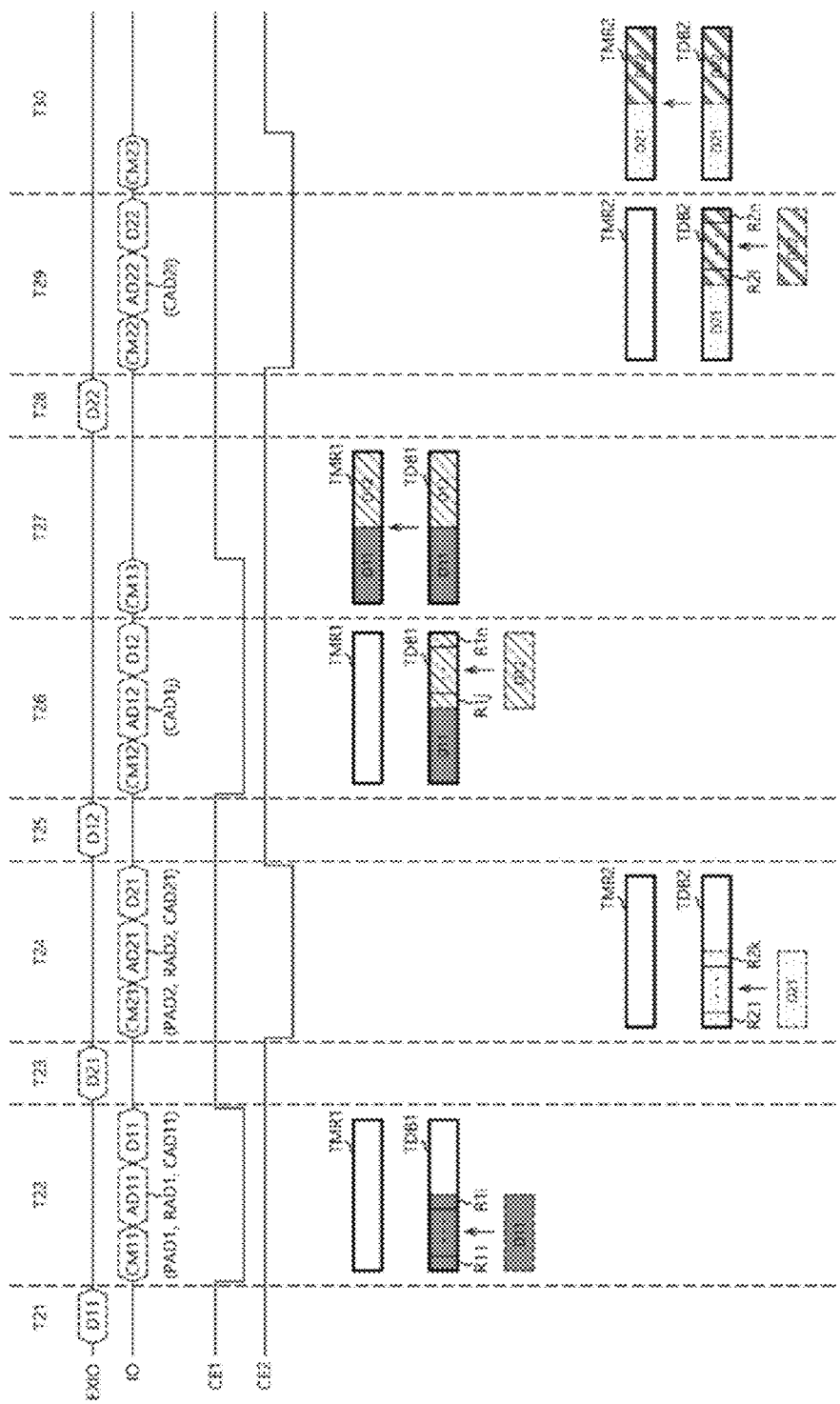
FIG. 6 is a diagram illustrating an operating method of the data storage device of FIG. 5.

FIG. 6 is a diagram illustrating an example of an operating method of the data storage device 200 of FIG. 5. In FIG. 6, it is assumed that the size of each of the first and third data D11 and D21 is less than the unit of write data of the nonvolatile memory device 120 while the respective total sizes of the first and second data D11 and D12 and of the third and fourth data D21 and D22 correspond to the unit of write data.

Referring to FIG. 6, time segments T22 and T24 may be substantially similar to the time segment T12 of FIG. 3, time segments T26 and T29 may be substantially similar to time segment T14 of FIG. 3, and time segments T27 and T30 may be substantially similar to time segment T15 of FIG. 3.

In time segment T21, the controller 210 receives first data D11 from the external device through a transmission line EXIO.

In time segment T22, the controller 210 may then perform the first data input operation to the nonvolatile memory device 221 with the provided first data D11. In more detail, the controller 210 may perform the first data input operation by enabling the enable signal CE1 corresponding to the nonvolatile memory device 221, for example, to a logic low level, and simultaneously transmitting a first command CM11, an address AD11 and first data D11 to the nonvolatile memory device 221.

The address AD11 may include a plane address PAD1 which may specify the target memory region TMR1, a row address RAD1, and a start column address CAD11, that is, a column address corresponding to a register R11.

Based on the first command CM11 and the address AD1, the nonvolatile memory device 221 may select the register R11, which is a first register to collect the first data D11 at the target data buffer TDB1 of the nonvolatile memory device 221, and may collect the first data D11 in registers R11 to R1$i$ at the target data buffer TDB1 of the nonvolatile memory device 221.

Upon collection of the first data D11, the controller 210 may determine whether the size of the collected first data D11 corresponds to the unit of write data. Since the size of the first data D11 does not correspond to the unit of write data as assumed in the Illustrated embodiment of FIG. 6, the controller 210 receives the second data D12 from the external device.

In time segment T23, the controller 210 receives third data D21 from the external device to be stored at the target data buffer TDB.

In time segment T24, the controller 210 may perform the first data input operation to the nonvolatile memory device 222 with the provided third data D21. In detail, the controller 210 may perform the first data input operation by enabling the enable signal CE2 corresponding to the nonvolatile memory device 222, for example, to a logic low level, and simultaneously transmitting a first command CM21, an address AD21 and third data D21 to the nonvolatile memory device 222.

The address AD21 may include a plane address PAD2 which may specify the target memory region TMR2, a row address RAD2, and a start column address CAD21, that is, a column address corresponding to a register R21.

Based on the first command CM21 and the address AD21, the nonvolatile memory device 222 may select the register R21, which is a first one to collect the third data D21 as the target data buffer TDB2 of the nonvolatile memory device 222, and input the third data D21 to registers R21 to R2$k$ as the target data buffer TDB2 of the nonvolatile memory device 222.

Upon collection of the third data D21, the controller 210 may determine whether the size of the collected third data D21 corresponds to the unit of write data. Since the size of the third data D21 does not correspond to the unit of write data as assumed, the controller 210 may receive the fourth data D22 from the external device.

In time segment T25, the controller 210 may receive second data D12 for the first nonvolatile memory device 221 from the external device.

In time segment T26, the controller 210 may perform the second data input operation to the nonvolatile memory device 221 with the provided second data D12. In more detail, the controller 210 may perform the second data input operation by enabling the enable signal CE1 corresponding to the nonvolatile memory device 221, for example, to a logic low level, and simultaneously transmitting a second command CM12, an address AD12 and second data D12 to the nonvolatile memory device 221.

The address AD12 may include a column address CAD1j corresponding to a register R1j. The register R1j may be a register which follows the registers R11 to R1i occupied by the first data D11. The controller 210 may determine the column address CADj based on the size of the first data D11 and the size of the respective registers R11 to R1n of the nonvolatile memory device 221. Because the target data buffer TDB1 of the nonvolatile memory device 221 has been already specified based on the address AD11 during the first data input operation to the target data buffer TDB1 of the nonvolatile memory device 221, the address AD12 may not include the plane address PAD1 or the row address RAD1. Therefore, the controller 210 may perform one of the first and second data input operations according to the provided addresses AD11 and AD12.

Based on the second command CM12 and the address AD12, the nonvolatile memory device 221 may select the register R1j, which is a first one to collect the second data D12 as the target data buffer TDB1, and store the second data D12 in registers R1j to R1n as the target data buffer TDB1.

In time segment T27, the controller 210 may determine whether the size of the collected first and second data D11 and D12 in the target data buffer TDB1 becomes equal to the unit of write data, and control the nonvolatile memory device 221 to perform the write operation to the target memory region TMR1 of the nonvolatile memory device 221 with the collected first and second data D11 and D12.

In detail, when controller 210 determines that the size of the collected first and second data D11 and D12 in the target data buffer TDB1 becomes equal to the unit of write data, the controller 210 may control the nonvolatile memory device 221 by enabling the enable signal CE1 corresponding to the nonvolatile memory device 221, for example, to a logic low level, and simultaneously transmitting a third command CM13 to the nonvolatile memory device 221.

The nonvolatile memory device 221 may perform the write operation by collectively storing the collected first and second data D11 and D12 of the target data buffer TDB1 into the target memory region TMR1 based on the third command CM13.

In time segment T28, the controller 210 may receive fourth data D22 (i.e., second data for the nonvolatile memory device 222) from the external device.

In time segment T29, the controller 210 may perform the second data input operation to the nonvolatile memory device 222 with the provided fourth data D22. In detail, the controller 210 may perform the second data input operation by enabling the enable signal CE2 corresponding to the nonvolatile memory device 222, for example, to a logic low level, and simultaneously transmitting a second command CM22, an address AD22 and fourth data D22 to the nonvolatile memory device 222.

The address AD22 may include a column address CAD21 corresponding to a register R21. The register R21 may be a register which follows the registers R21 to R2k occupied by the third data D21. The controller 210 may determine the column address CAD21 based on the size of the third data D21 and the size of the respective registers R21 to R2n of the nonvolatile memory device 222. Because the target data buffer TDB2 of the nonvolatile memory device 222 has been already specified based on the address AD21 during the first data input operation to the target data buffer TDB2 of the nonvolatile memory device 222, the address AD22 may not include the plane address PAD2 or the row address RAD2. Therefore, the controller 210 may perform one of the first and second data input operations according to the provided addresses AD21 and AD22.

Based on the second command CM22 and the address AD22, the nonvolatile memory device 222 may select the register R21, which is a first one to collect the fourth data D22 as the target data buffer TDB2, and store the fourth data D22 in registers R21 to R2n as the target data buffer TDB2.

In time segment T30, the controller 210 may determine whether the size of the collected third and fourth data D21 and D22 in the target data buffer TDB2 becomes equal to the unit of write data, and control the nonvolatile memory device 222 to perform the write operation to the target memory region TMR2 of the nonvolatile memory device 222 with the collected third and fourth data D21 and D22.

In detail, when controller 210 determines that the size of the collected third and fourth data D21 and D22 in the target data buffer TDB2 becomes equal to the unit of write data, the controller 210 may control the nonvolatile memory device 222 by enabling the enable signal CE2 corresponding to the nonvolatile memory device 222, for example, to a logic low level, and simultaneously transmitting a third command CM23 to the nonvolatile memory device 222.

The nonvolatile memory device 222 may perform the write operation by collectively storing the collected third and fourth data D21 and D22 of the target data buffer TDB2 Into the target memory region TMR2 based on the third command CM3.

Although the controller 210 has been Illustrated in FIG. 6 as transmitting data to the nonvolatile memory devices 221 and 222 in an interleaving manner, embodiments are not limited to this. According to an embodiment, the controller 210 may transmit data sequentially to, for example, only to the nonvolatile memory device 221 and control the write operation of the nonvolatile memory device 221 until for example a unit of write data has been transmitted for storing into a target memory region TMR of the nonvolatile memory region 221.

Figure 7:
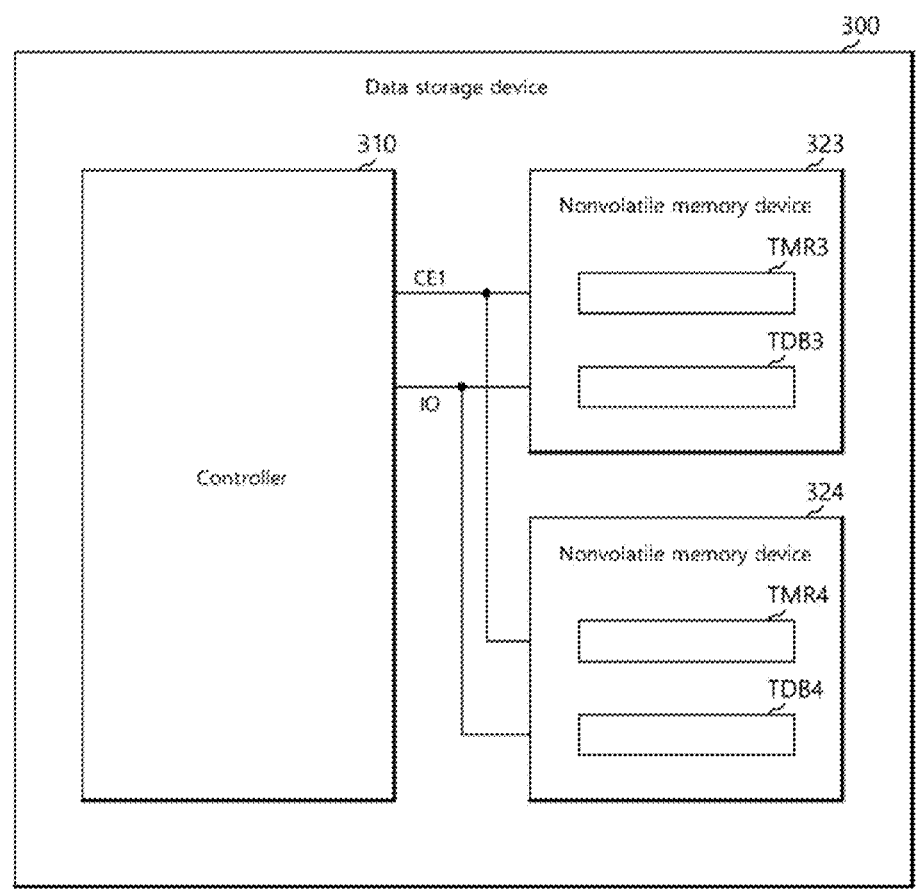
FIG. 7 is a block diagram Illustrating a data storage device according to yet another embodiment of the present invention.

FIG. 7 illustrates yet another embodiment of a data storage device 300 according to the present invention.

Referring to FIG. 7, the data storage device 300 may include a controller 310 and nonvolatile memory devices 323 and 324.

Unlike the controller 210 of FIG. 5, the controller 310 may control the nonvolatile memory devices 323 and 324 using a single enable signal CE. In this case, the controller 310 may selectively control the nonvolatile memory devices 323 and 324 by including device addresses respectively corresponding to the nonvolatile memory devices 323 and 324, in addresses that are transmitted to the nonvolatile memory devices 323 and 324.

The nonvolatile memory devices 323 and 324 may respectively correspond to the device addresses. The nonvolatile memory devices 323 and 324 each may operate in response to the corresponding device address transmitted from the controller 310.

Except that the controller 310 transmits device addresses to control any one of the nonvolatile memory devices 323 and 324, the controller 310 may control each of the nonvolatile memory devices 323 and 324 in a substantially similar manner to that of the method in which the controller 110 of FIG. 1 controls the nonvolatile memory device 120.

Figure 8:
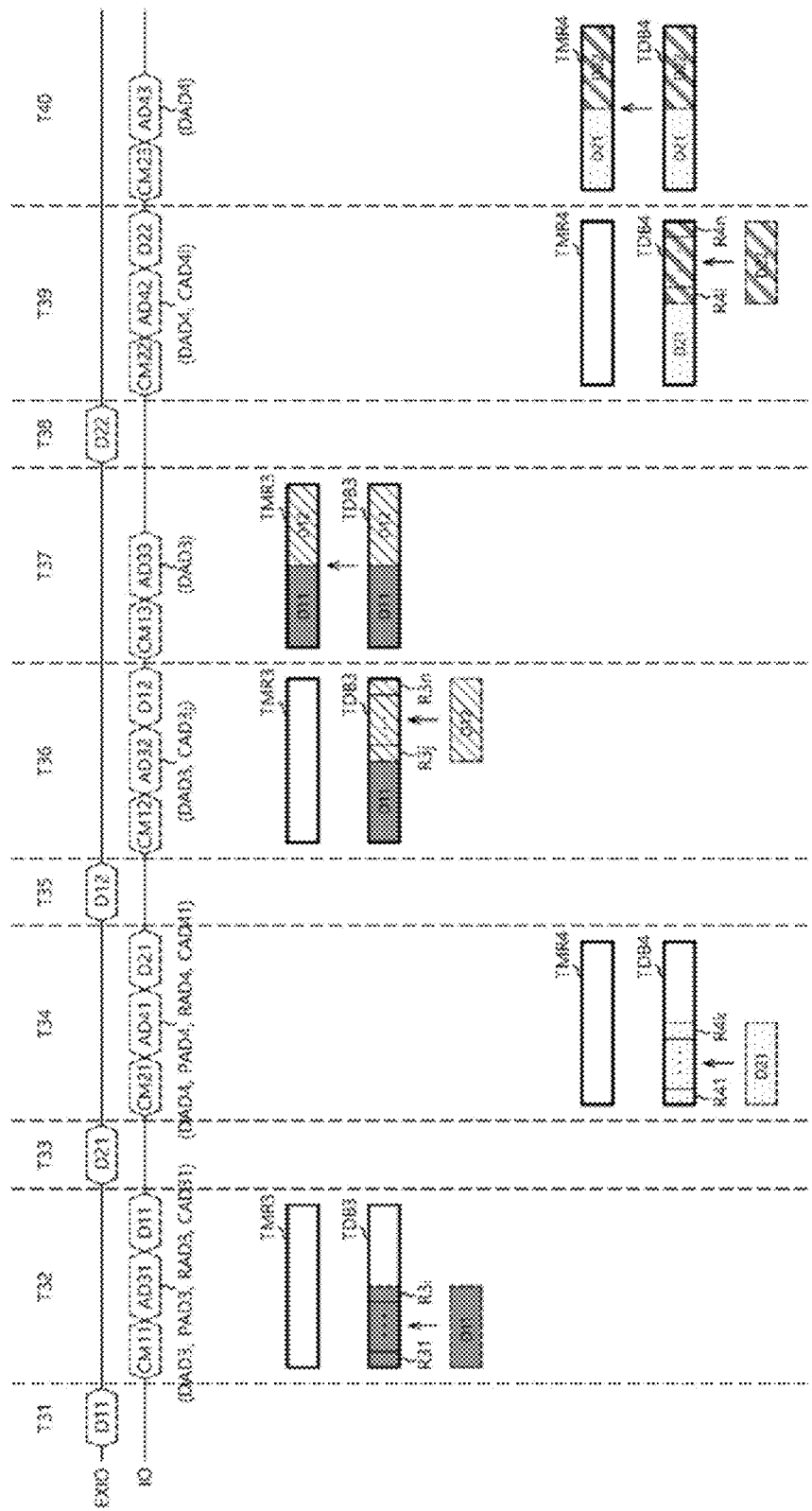
FIG. 8 is a diagram Illustrating an operating method of the data storage device of FIG. 7, according to an embodiment of the present invention.

FIG. 8 is a diagram illustrating an example of an operating method of the data storage device 300 of FIG. 7.

Referring to FIG. 8, situations T31 to T40 may be substantially similar to time segments T21 to T30 of FIG. 6. Therefore, hereinafter, description will be focused on differences from the case of FIG. 6.

In time segments T32, T34, T36, T37, T39 and T40, the controller 310 may additionally transmit, to control the respective nonvolatile memory devices 323 and 324, device addresses DAD3 and DAD4 that respectively correspond to the nonvolatile memory devices 323 and 324. For example, in time segment T32, the controller 310 may further include, in the address AD31, the device address DAD3 corresponding to the nonvolatile memory device 323 before transmitting it. In this case, the nonvolatile memory device 323 may operate in response to the device address DAD3.

Figure 9:
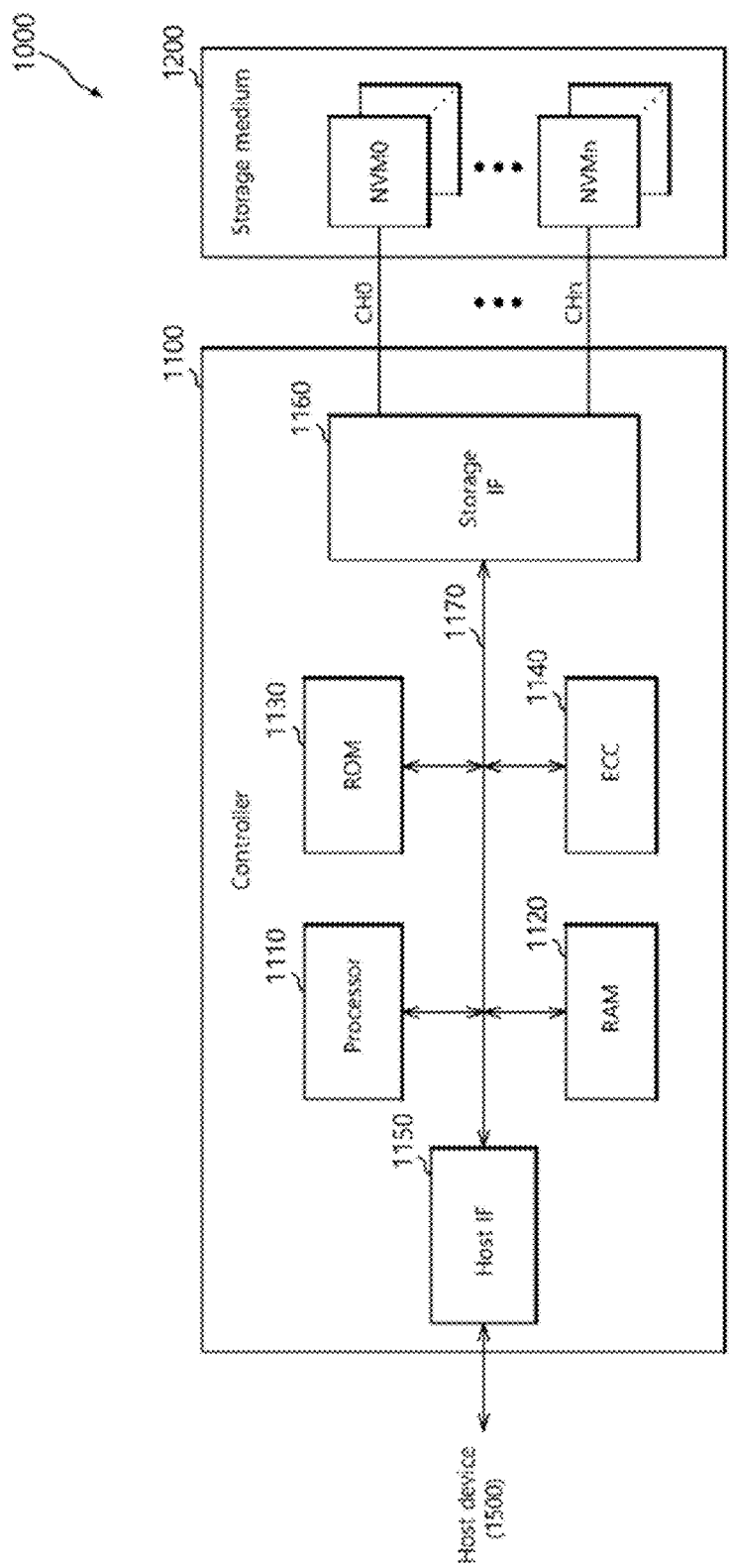
FIG. 9 is a block diagram Illustrating a solid state drive (SSD) according to an embodiment of the present invention.

FIG. 9 illustrates a solid state drive (SSD) 1000, according to an embodiment of the present invention.

The SSD 1000 may include a controller 1100 and a storage medium 1200.

The controller 1100 may control data exchange between a host device 1500 and the storage medium 1200. The controller 1100 may include a processor 1110, a RAM 1120, a ROM 1130, an ECC unit 1140, a host interface 1150, and a storage medium Interface 1160.

The controller 1100 may operate in a substantially similar manner to that of the controllers 110, 210 and 310 of FIGS. 1, 5 and 7. When data is acquired, the controller 1100 performs the first data input operation for the acquired data. When data is acquired, the controller 110 performs the first data input operation regardless of whether the data corresponds to the unit of write data of a target memory region of a target nonvolatile memory device. Hence, the acquired data is stored in a target data buffer of the target nonvolatile memory device. Then, if the size of the collected data in the target data buffer is equal to the size of the target memory region TMR of the target nonvolatile memory device, then the controller will transmit the collected data to the target memory region TMR. If the size of the collected data is less than the size of the unit of write data for the target nonvolatile memory device, the controller 1100 may perform a second data input operation for a subsequent data received from the host by collecting the subsequent data into the target data buffer of the nonvolatile memory device and then determine whether or not the size of the combined data stored in the target data buffer has reached the size of the unit of write data. If the size of the combined data has not yet reached the size of the unit of write data, the second data input operation is repeated until it is determined that data having the unit of write data has been transmitted through the repeated data input operations. When it is determined that data having the unit of write data has been transmitted, the controller 1100 may then control the target nonvolatile memory device so that the data stored into the target data buffer TDB hitherto is stored in the target memory region TMR of the target volatile memory device.

The processor 1110 may control the operations of the controller 1100. The processor 1110 may store data in the storage medium 1200 and read stored data from the storage medium 1200, according to data processing requests from the host device 1500. In order to efficiently manage the storage medium 1200, the processor 1110 may control the internal operations of the SSD 1000, such as a merge operation, a wear leveling operation, and so forth.

The RAM 1120 may store programs and program data to be used by the processor 1110. The RAM 1120 may temporarily store data transmitted from the host interface 1150 before transferring them to the storage medium 1200, and may temporarily store data transmitted from the storage medium 1200 before transferring them to the host device 1500.

The ROM 1130 may store program codes to be read by the processor 1110. The program codes may include commands to be processed by the processor 1110 for the processor 1110 to control the internal units of the controller 1100.

The ECC unit 1140 may encode data to be stored in the storage medium 1200, and may decode data read from the storage medium 1200. The ECC unit 1140 may detect and correct an error occurred in data, according to an ECC algorithm.

The host interface 1150 may exchange data processing requests, data, etc. with the host device 1500.

The storage medium Interface 1160 may transmit control signals and data to the storage medium 1200. The storage medium interface 1160 may be transmitted with data from the storage medium 1200. The storage medium interface 1160 may be coupled with the storage medium 1200 through a plurality of channels CH0 to CHn.

The storage medium 1200 may include a plurality of nonvolatile memory devices NVM0 to NVMn. Each of the plurality of nonvolatile memory devices NVM0 to NVMn may perform a write operation and a read operation according to the control of the controller 1100.

Figure 10:
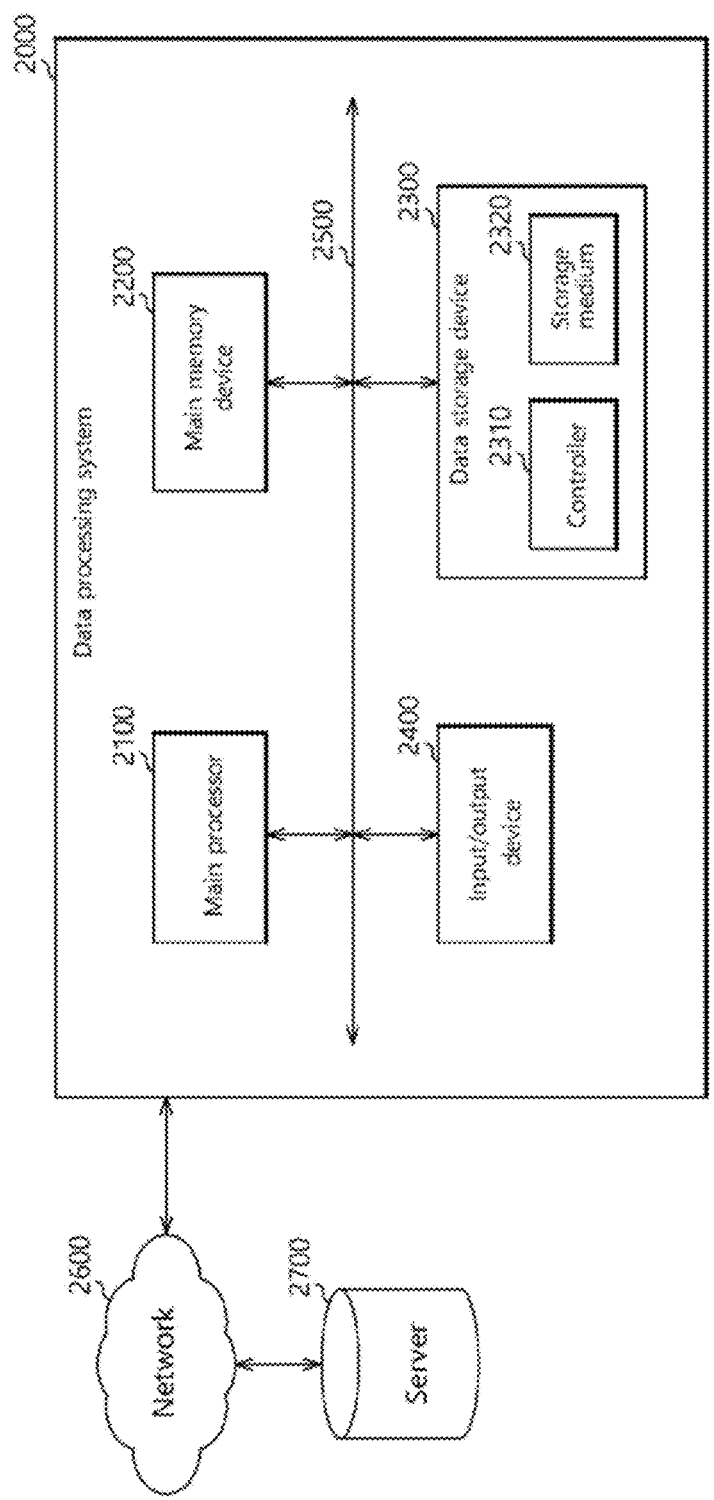
FIG. 10 is a block diagram illustrating a data processing system including a data storage device according to an embodiment of the present invention.

FIG. 10 is a block diagram illustrating a data processing system 2000 including a data storage device 2300. The data storage device may be at least one of the data storage devices 100, 200 or 300 of the embodiments of FIGS. 1, 5 and 7.

The data processing system 2000 may be or include a computer, a laptop, a netbook, a smart phone, a digital TV, a digital camera, a navigator, etc. The data processing system 2000 may include a main processor 2100, a main memory device 2200, a data storage device 2300, and an input/output device 2400. The internal units of the data processing system 2000 may exchange data, control signals, etc. through a system bus 2500.

The main processor 2100 may control the operations of the data processing system 2000. The main processor 2100 may be, for example, a central processing unit such as a microprocessor. The main processor 2100 may execute the software of an operation system, an application, a device driver, and so forth, on the main memory device 2200.

The main memory device 2200 may store programs and program data to be used by the main processor 2100. The main memory device 2200 may temporarily store data to be transmitted to the data storage device 2300 and the input/output device 2400.

The data storage device 2300 may include a controller 2310 and a storage medium 2320. The data storage device 2300 may be configured and operate in a manner substantially similar to the data storage device 100 shown in FIG. 1, or to the data storage device 200 of FIG. 5 or to the data storage device 300 of FIG. 7.

The input/output device 2400 may include a keyboard, a scanner, a touch screen, a screen monitor, a printer, a mouse, or the like, capable of exchanging data with a user, such as receiving a command for controlling the data processing system 2000 from the user or providing a processed result to the user.

According to an embodiment, the data processing system 2000 may communicate with at least one server 2700 through a network 2600 such as a LAN (local area network), a WAN (wide area network), a wireless network, and so on. The data processing system 2000 may include a network interface (not shown) to access the network 2600.

While various embodiments have been described above, it will be understood to those skilled in the art that the embodiments described are examples only. Accordingly, the data storage device described herein should not be limited based on the described embodiments.

What is claimed is:

1. A data storage device comprising:
   a first nonvolatile memory device including a target memory region and a plurality of registers corresponding to the target memory region; and
   a controller suitable for performing a first data input operation to transmit first data, which is to be stored in the target memory region, to the first nonvolatile memory device, and performing a second data input operation to transmit second data to the first nonvolatile memory device when the size of the first data does not correspond to the target memory region,
   wherein the controller performs the second data input operation by transmitting a column address corresponding to a register to which the second data is to be inputted in succession to registers to which the first data has been inputted.

2. The data storage device according to claim 1, wherein the controller iterates the second data input operation for subsequent data until it is determined that data having a size corresponding to the target memory region has been transmitted to the first nonvolatile memory device through the first and second data input operations.

3. The data storage device according to claim 2, wherein the controller controls the first nonvolatile memory device so that the data having the size corresponding to the target memory region is collectively stored in the target memory region.

4. The data storage device according to claim 1,
   further comprising a second nonvolatile memory device,
   wherein the controller transmits a device address corresponding to the first nonvolatile memory device to the first and second nonvolatile memory devices to control the first nonvolatile memory device.

5. The data storage device according to claim 1,
   further comprising a second nonvolatile memory device,
   wherein the controller enables an enable signal corresponding to the first nonvolatile memory device and disables an enable signal corresponding to the second nonvolatile memory device to control the first nonvolatile memory device.

6. A data storage device comprising:
   a first nonvolatile memory device including a target memory region and a plurality of registers corresponding to the target memory region; and
   a controller suitable for performing a first data input operation to transmit first data to the first nonvolatile memory device regardless of whether second data to be stored in the target memory region collectively with the first data has been acquired, performing a second data input operation to transmit the second data to the first nonvolatile memory device, and controlling the first nonvolatile memory device such that data transmitted to the first nonvolatile memory device is collectively stored in the target memory region,
   wherein the controller performs the second data input operation by transmitting a column address corresponding to a register to which the second data is to be inputted in succession to registers to which the first data has been inputted.

7. The data storage device according to claim 6, wherein the controller iterates the second data input operation for subsequent data until it is determined that data having a size corresponding to the target memory region has been transmitted to the first nonvolatile memory device through the first and second data input operations.

8. The data storage device according to claim 7, wherein the controller controls, when it is determined that the data having the size corresponding to the target memory region has been transmitted, the first nonvolatile memory device such that the data transmitted to the first nonvolatile memory device is simultaneously stored in the target memory region.

9. The data storage device according to claim 6,
   further comprising a second nonvolatile memory device,
   wherein the controller transmits a device address corresponding to the first nonvolatile memory device to the first and second nonvolatile memory devices to control the first nonvolatile memory device.

10. The data storage device according to claim 6,
    further comprising a second nonvolatile memory device,
    wherein the controller enables an enable signal corresponding to the first nonvolatile memory device and disables an enable signal corresponding to the second nonvolatile memory device to control the first nonvolatile memory device.

11. A data storage device comprising:
    first and second nonvolatile memory devices; and
    a controller suitable for performing a first data input operation to transmit first data to the first nonvolatile memory device, performing a second data input operation to transmit second data to the first nonvolatile memory device, performing the first data input operation to transmit third data to the second nonvolatile memory device between the first and second data input operations for the first nonvolatile memory device, and controlling the first nonvolatile memory device such that the first and second data transmitted to the first nonvolatile memory device are collectively stored in a target memory region of the first nonvolatile memory device,
    wherein the first nonvolatile memory device comprises a plurality of registers corresponding to the target memory region, and
    wherein the controller performs the second data input operation by transmitting a column address corresponding to a register to which the second data is to be inputted in succession to registers to which the first data has been inputted.

12. The data storage device according to claim 11, wherein the controller performs the first data input operation regardless of whether the second data has been acquired.

13. The data storage device according to claim 11, wherein the controller performs the first data input operation regardless of whether a size of the first data corresponds to the target memory region.

14. The data storage device according to claim 11, wherein the controller iterates the second data input operation for subsequent data until it is determined that data having a size corresponding to the target memory region has been transmitted to the first nonvolatile memory device through the first and second data input operations.

15. The data storage device according to claim 14, wherein the controller controls the first nonvolatile memory device such that the data having the size corresponding to the target memory region is collectively stored in the target memory region.

16. The data storage device according to claim 11, wherein the controller transmits, to control any one of the first and second nonvolatile memory devices, a device address corresponding to the any one to the first and second nonvolatile memory devices.

17. The data storage device according to claim 11, wherein the controller enables, to control any one of the first and second nonvolatile memory devices, an enable signal corresponding to the any one and disables an enable signal corresponding to the other one of the first and second nonvolatile memory devices.

* * * * *